(12) United States Patent
Toussaint

(10) Patent No.: US 10,718,451 B2
(45) Date of Patent: Jul. 21, 2020

(54) ASSEMBLY COMPONENT FOR A VACUUM CHAMBER AND METHOD FOR PRODUCING THE ASSEMBLY COMPONENT

(71) Applicant: COMMISSARIAT A L'ENERGIE ATOMIQUE ET AUX ENERGIES ALTERNATIVES, Paris (FR)

(72) Inventor: Patrice Toussaint, Dragey (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 367 days.

(21) Appl. No.: 15/498,842

(22) Filed: Apr. 27, 2017

(65) Prior Publication Data

US 2017/0314713 A1    Nov. 2, 2017

(30) Foreign Application Priority Data

Apr. 28, 2016   (FR) .................................... 16 53829

(51) Int. Cl.
*F16L 23/02*       (2006.01)
*F16L 23/20*       (2006.01)
*F16L 23/026*      (2006.01)
B23K 101/04        (2006.01)
B23K 103/10        (2006.01)

(52) U.S. Cl.
CPC ............ *F16L 23/02* (2013.01); *F16L 23/20* (2013.01); *B23K 2101/04* (2018.08); *B23K 2103/10* (2018.08)

(58) Field of Classification Search
CPC ......... F16L 23/02; F16L 23/20; F16L 23/026; F16L 19/00; F16L 19/0218; F16L 23/0283; F16L 23/16; F16L 17/025; F16L 17/06; F16L 17/08; F16L 23/12; F16L 23/125; F16L 23/024
USPC .... 285/288.1, 405, 406, 412, 414, 363, 364, 285/368, 379, 336
See application file for complete search history.

(56) References Cited

U.S. PATENT DOCUMENTS 1,821,866 A * 9/1931 Wilson .................... F16L 23/20
                                                      285/363
4,799,692 A    1/1989 Batzer et al.
6,409,180 B1 * 6/2002 Spence ................ F16J 15/0881
                                                      277/608

FOREIGN PATENT DOCUMENTS

JP      H04254577 A       9/1992
JP      08109987 A   *   4/1996  .............. F16L 23/02
WO      2015033073 A1    3/2015

OTHER PUBLICATIONS

Ray Taheri, Evaluation of Electroless Nickel-Phosphorus (EN) Coatings, Spring 2003, University of Saskatchewan, pp. ii-iii and 53-54 (Year: 2003).*

(Continued)

*Primary Examiner* — Zachary T Dragicevich
*Assistant Examiner* — William S. Choi
(74) *Attorney, Agent, or Firm* — Baker & Hostetler LLP

(57) ABSTRACT

An assembly component for a vacuum chamber, comprising a body and a flange, has a surface configured to press a seal against another mechanical part. The flange is made of an aluminum alloy and the surface is covered with a metal deposit mostly comprising nickel.

13 Claims, 5 Drawing Sheets

(56) References Cited

OTHER PUBLICATIONS

Hajime Ishimaru, "Bakable Aluminium Vacuum Chamber and Bellows with an Aluminum Flange and Metal Seal for Ultrahigh Vacuum", Journal of Vacuum Science and Technology, Nov. 1, 1978, pp. 1853-1854, vol. 15, No. 6, Science & Technology of Materials, Interfaces and Processing, XP055310151.

\* cited by examiner

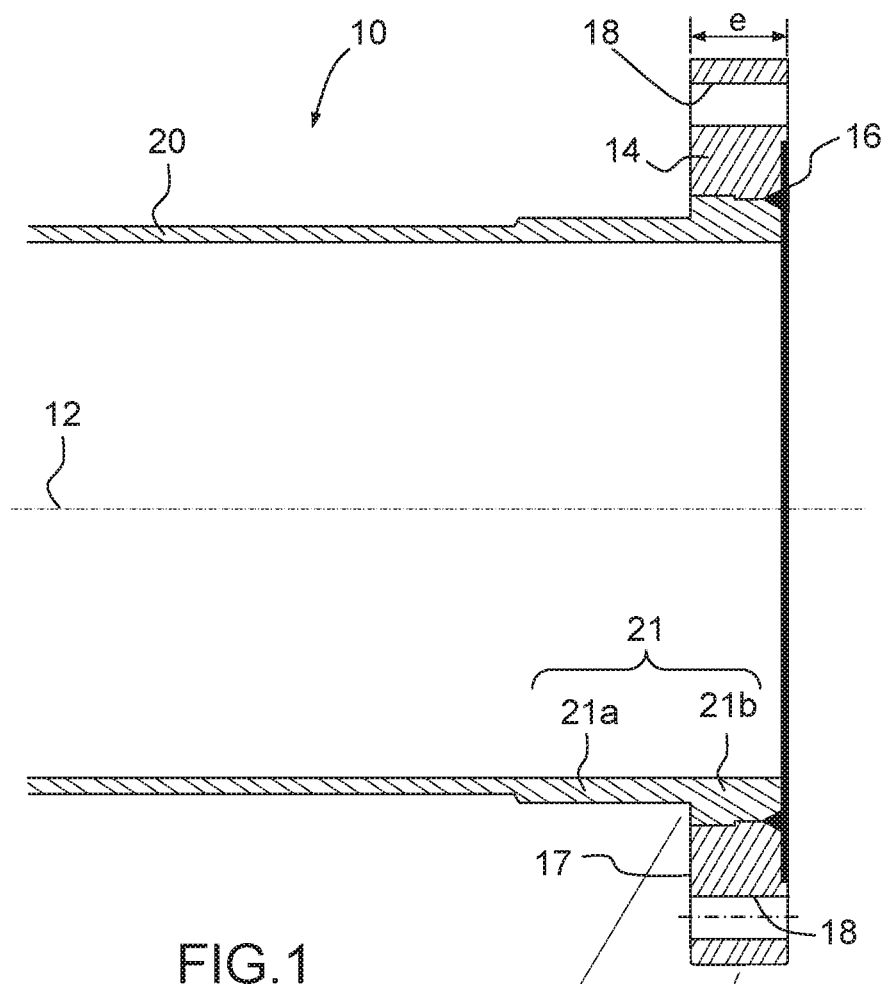
FIG.1
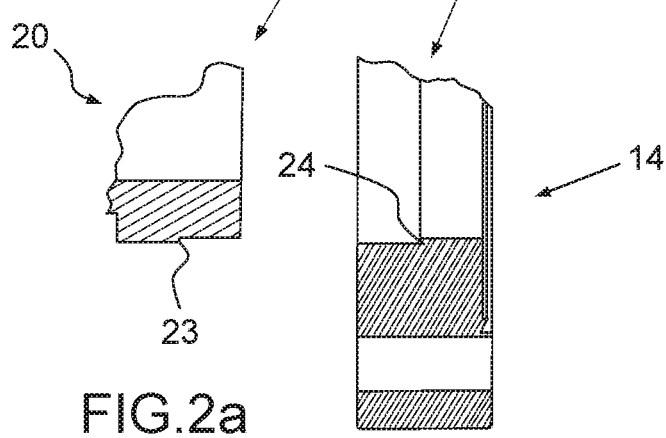
FIG.2a
FIG.2b

ASSEMBLY COMPONENT FOR A VACUUM CHAMBER AND METHOD FOR PRODUCING THE ASSEMBLY COMPONENT

CROSS-REFERENCE TO RELATED APPLICATIONS

This application claims priority to foreign French patent application No. FR 1653829, filed on Apr. 28, 2016, the disclosure of which is incorporated by reference in its entirety.

BACKGROUND OF THE INVENTION

The invention relates to vacuum chambers and more specifically the joining together of casing elements used in vacuum chambers. The invention is particularly useful in a particle accelerator in which a high vacuum is realized. The invention is not limited to this use and can be implemented in any type of vacuum chamber. They are used for example for high-power lasers and for space simulators.

In a particle accelerator, it is common to carry out helium leakage tests in order to achieve values of around $10^{-10}$ Pa·m$^3$/s. In addition to such leaktightness, the chamber is made of materials that outgas as little as possible in order to avoid any disruption of the experiments carried out in the accelerator.

Vacuum chambers cannot be made of one-piece mechanical parts and assemblies are necessary. These assemblies have to be disassemblable so as to allow operators to work inside the chambers and to allow the connection of equipment such as vacuum pumps or measurement sensors.

One known solution for producing an assembly that is usable in a vacuum chamber consists in flanging two mechanical elements to be joined together. More specifically, the elements to be joined together have complementary faces, between which a seal is pressed. In order to avoid the possible outgassing of the seal, it is preferable to use a metal seal, the rate of outgassing of which is around one hundred times lower than that of elastomeric seals.

In order that the surfaces between which the seals are pressed are not damaged, the hardness of the seals has to be lower than that of the facing surfaces. It is possible, for example, to produce the casing elements of the chambers from stainless steel, in particular steels known under their standard designation of type 304L according to the American standard AISI or 1.4306 according to the European standard EN 10027, or of type 316L (American standard) or 1.4404 (European standard). These steels are known notably for their excellent weldability, this making it easier to assemble the chambers. Conventional seals fitted between surfaces made of such steels are made of copper alloy or aluminum alloy.

It may be necessary, notably on account of weight constraints, to make the casing elements of the chambers from more lightweight metals, notably from aluminum alloy. Some aluminum alloys moreover have many advantages for producing vacuum chambers, such as their low rate of outgassing, their cost, their ease of machining, their magnetic permeability, their low activation by neutrons, much lower hydrogen permeation than stainless steel, their thermal conductivity making it possible to more easily stove the vacuum chambers and to dissipate heat inputs without additional cooling, etc.

Some alloys containing zinc should be avoided because their vapor pressure is not compatible with the ultrahigh vacuum necessary in a particle accelerator. Although the weldability of aluminum alloys is generally less good than that of stainless steels, some alloys from the standard series 1000, 5000 and 6000 according to the European standard EN 485-2 have very good weldabilities.

In order to allow the fitting of metal seals between assembly surfaces, one American company: Atlas Technologies, the headquarters of which are at 3100 Copper Avenue in Fenton in the state of Michigan, has developed aluminum flanges covered with a surface of stainless steel. The aluminum part of the flange can be welded to a casing element of a vacuum chamber and the stainless steel surface makes it possible to squeeze a metal seal, for example a copper seal. The flanges of this company are widely used in renowned particle accelerators, notably that of CERN located close to Geneva, Switzerland.

The Applicant company has encountered difficulties in employing these flanges, resulting in a reject rate of around 20%, notably on account of the occurrence of leaks at the stainless steel/aluminum junction. These flanges are fitted on the casing elements of the vacuum chambers by fusion welding, this also involving risks of porosity in the welds. Another obstacle to the use of these flanges is their high cost.

SUMMARY OF THE INVENTION

The invention aims to remedy all or some of the above-mentioned problems by proposing a flange made of aluminum alloy that can be joined by welding to a casing element also made of an aluminum alloy. The flange according to the invention has sufficient hardness to allow a deformable seal to be squeezed. It is possible to employ a one-piece metal seal, for example a seal made of copper, aluminum, or the like. A seal comprising a metal casing and an elastic internal element, or an elastomeric seal, may also be used. An aim of the invention is to avoid recourse to a stainless steel deposit, thereby avoiding the junction between stainless steel and aluminum.

To this end, the subject of the invention is an assembly component for a vacuum chamber, the component comprising a body and a flange, one surface of which is configured to press a seal against another mechanical part. The flange has a substantially flat washer shape extending about an axis. The body has a tubular shape about the axis. The body extends along the axis substantially from the surface beyond a thickness of the flange along the axis. The flange and the body are made of an aluminum alloy and the surface configured to press a seal is covered with a metal deposit mostly comprising nickel.

According to a first embodiment of the assembly component, the flange and the body form two mechanical parts that are produced separately and are configured to be joined together by welding that is advantageously carried out in a region set back from the surface covered with the metal deposit.

Advantageously, the set-back region does not have any metal deposit.

The metal deposit advantageously comprises between 9% and 12% by weight phosphorus.

In the first embodiment, the flange and the body can be made of aluminum alloys of different references according to the European standard EN 485-2.

The body may be a tube of circular cross section extending along an axis. The flange then has a washer shape pierced substantially at the outside diameter of the tube, the surface of the flange covered with the metal deposit mostly comprising nickel and extending mainly perpendicularly to the axis of the tube.

The assembly component advantageously comprises, close to the flange, an overthickness disposed so as to increase the exterior cross section of the body without changing the interior cross section of the body.

Advantageously, in the first embodiment, the overthickness is part of the body and comprises two parts, with a first part extending in continuation of the flange and a second part extending beyond the flange along the axis.

A further subject of the invention is a flange for a vacuum chamber, the flange having a surface configured to press a seal against another mechanical part, the flange having a substantially flat washer shape extending about an axis, the flange being configured to be joined to a body made of an aluminum alloy of tubular shape about the axis, the body extending substantially from the surface along the axis beyond a thickness of the flange. The flange is made of an aluminum alloy and the surface is covered with a metal deposit mostly comprising nickel.

A further subject of the invention is a method for producing an assembly component according to the invention, wherein the metal deposit mostly comprising nickel is produced chemically.

The welding of the flange to the body is advantageously carried out by friction stir welding.

In order to carry out the friction stir welding, a pin passes into an interface between the flange and the body. Advantageously, before the pin is withdrawn from the interface, the pin is moved in translation parallel to the surface, away from the body.

The set-back region is advantageously produced by removal of material following chemical deposition of the metal deposit.

After welding, the surface may be machined locally at the weld so as to form the set-back region.

BRIEF DESCRIPTION OF THE DRAWINGS

The invention will be better understood and further advantages will become apparent from reading the detailed description of an embodiment given by way of example, said description being illustrated by the appended drawing, in which:

FIG. 1 shows, in cross section, a first embodiment of an assembly component implementing the invention;

FIGS. 2a and 2b show, in partial cross section, a body and a flange that form the component in FIG. 1 when joined together;

For the sake of clarity, the same elements will bear the same references in the various figures.

DETAILED DESCRIPTION OF PREFERRED EMBODIMENTS

Figure 3A:
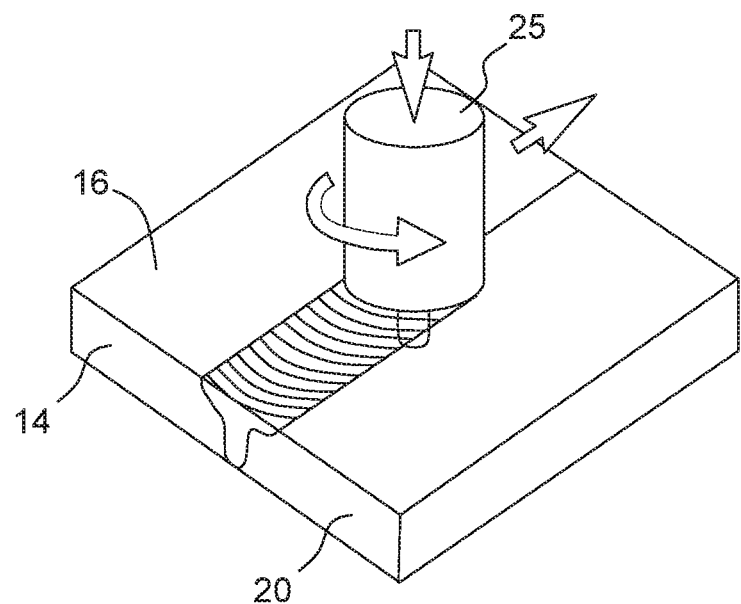
FIGS. 3a and 3b illustrate a method for joining together the body and the flange.

FIG. 1 shows a mechanical assembly component 10 of tubular shape in cross section along its longitudinal axis 12. The component 10 forms a casing element of a vacuum chamber intended to be joined in a sealed manner to another casing element. The assembly is realized by means of a flange 14 comprising a flat surface 16 which is, for example, perpendicular to the axis 12. The flange 14 has, for example, a flat washer shape extending substantially perpendicularly to the axis 12 between the flat surface 16 and another surface 17 parallel to the surface 16. The flange 14 comprises a plurality of holes 18 parallel to the axis 12. The holes 18 are distributed around the axis 12. The other casing element, not shown, to be joined to the element 10, has another flange, symmetrical to the flange 14 with respect to the surface 16. A seal is intended to be pressed between the surface 16 of the flange 14 and the other flange. The pressing is ensured by bolts passing through the holes 18 and similar holes in the other flange. The seal is advantageously a metal seal, for example made of copper, which deforms while the two flanges are being pressed against one another. More generally, any deformable seal the hardness of which is less than that of the surface 16 can be employed. The choice of seal depends mainly on the use of the vacuum chamber. For example, for a particle accelerator, the metal seals are preferable on account of a lower risk of outgassing than an elastomeric seal. The deformation of the seal ensures the leaktightness of the assembly at the flanges. The surface 16 advantageously forms the bottom of a counterbore of axis 12. The counterbore makes it possible to keep the seal in place before it is pressed. The surface 16 extends mainly perpendicularly to the axis 12. It is possible to produce, in the surface 16, blades that protrude from a plane perpendicular to the axis 12. These blades penetrate the seal in order to improve the leaktightness of the assembly. The deformation of the seal fills the imperfections of the blades.

The assembly component 10 shown comprises a tubular body 20 extending about the axis 12. The body 20 extends along the axis 12, substantially from the flat surface 16 beyond a thickness e of the flange 14 along the axis 12. In other words, the surface 16 forms one end of the component 10 along the axis 12. The component 10 extends along the axis 12 from this end. The thickness e of the flange 14 is defined between the surfaces 16 and 17. The body 20 extends beyond the surface 17. The vacuum chambers employed in a particle accelerator are used to convey a beam of particles therein that move along the axis 12 of the tube, hence the tubular shape of the body 20. The invention is not limited to this configuration and can be implemented for any other shape of casing component for a vacuum chamber, at which component a flange assembly is intended to be produced.

According to the invention, the surface 16 is covered with a metal deposit mostly comprising nickel. This deposit makes it possible to increase the hardness of the surface 16.

The nickel deposit can be produced electrolytically. However, it has been found that this deposition method lacks uniformity in the thickness of the deposit, notably when the surface 16 is not absolutely flat, for example when blades are produced therein. Specifically, an electrolytic deposit tends to be thicker as soon as a shape discontinuity occurs on account of a point effect. A chemical deposit of nickel is therefore preferable because it has a more regular thickness. This type of deposition of a nickel alloy can be carried out in an aqueous medium. It is possible, for example, to deposit a nickel alloy comprising around 10% by weight phosphorus. For certain uses of the vacuum chamber, it is preferable for the deposit to be non-magnetic. A proportion of phosphorus of between 9% and 12% makes it possible to obtain this property.

The thickness of the nickel alloy layer is chosen depending on the desired hardness of the surface 16. The presence of phosphorus tends to reduce the hardness of the layer. In order to deform a seal made of copper or the like, with a proportion of phosphorus of around 10%, a thickness greater than 10 μm is sufficient. Advantageously, a thickness greater than 30 μm provides good leaktightness of the coating of nickel alloy. This leaktightness is useful on account of the difference in galvanic couple between aluminum, nickel and copper, entailing a risk of oxidation of the aluminum in the event of porosity of the nickel alloy layer.

In-house tests on a 30 μm nickel alloy layer have shown a Vickers hardness measured according to the standard EN-ISO 6507-1 of between 23 and 27 HRC. Comparable tests on a flange made of stainless steel of type 316L gave values of between 22 and 30 HRC. This clearly shows that a metal deposit mostly comprising nickel deposited on a flange made of aluminum alloy makes it possible to obtain a hardness comparable to that of a flange made of solid stainless steel.

In order to improve the transmission, toward the body 20, of loads acting on the flange 14, it is possible to increase the thickness of the body 20 at its junction with the flange 14. More specifically, the body 20 can extend along the axis 12 with a constant interior cross section in the vicinity of the flange 14. Close to the flange 14, the body 20 can comprise an overthickness 21 disposed so as to increase its exterior cross section without changing the interior cross section.

As mentioned above, it is advantageous to produce the body 20 and the flange 14 from aluminum alloy. In the first embodiment, the body 20 and the flange 14 are produced separately and joined together by welding. In the case of a welded assembly, it is preferably for the body 20 and the flange 14 to be produced from the same alloy or from alloys of similar composition in order to improve the uniformity of the weld bead.

The overthickness 21 makes it easier to produce the assembly by welding. The overthickness 21 can comprise two parts 21a and 21b. The part 21b extends in continuation of the flange 14 between the surfaces 16 and 17. The part 21a extends beyond the flange 14 and the surface 17 thereof, along the axis 12. The exterior cross section of the part 21b is larger than the exterior cross section of the part 21a.

FIGS. 2a and 2b show the body 20 and the flange 14, respectively, before they are joined together and at a distance from one another.

The surface 16 can extend both over the flange 14 and over the body 20. In order to ensure reproducible positioning of the flange 14 on the body 20, for example in order to ensure the alignment of the two parts of the surface 16, one belonging to the body and the other to the flange 14, it is possible to produce a shoulder 23 in the body 20, against which a corresponding face 24 of the flange 14 bears.

The welding of the flange 14 and of the body 20 can be realized by local fusion of the flange 14 and of the body 20. For aluminum, it is possible in particular to use an arc welding method using a non-consumable electrode under a neutral gas atmosphere known in the literature under the acronym TIG for "Tungsten Inert Gas". This method requires aluminum alloys that are specifically suitable for welding. These alloys generally have mechanical characteristics that are weaker than other alloys. Moreover, fusion welding causes deformations of the welded parts and porosities which can be prejudicial to the production of a vacuum chamber.

In order to remedy these drawbacks, the flange 14 and the body 20 are advantageously welded by friction stir welding. This welding method, illustrated with the aid of FIGS. 3a and 3b, consists in joining the flange 14 and the body 20 together by putting them into a pasty state by virtue of a rotating pin 25. Friction stir welding makes it possible to join different aluminum alloys that are not weldable by fusion welding and without deformation. It is possible to use for the flange an aluminum alloy having better mechanical characteristics than those of an aluminum alloy prepared for welding. It is of course possible to join a flange made of an alloy not prepared for welding to a body which, for its part, is provided for welding in order to attach other parts of the vacuum chamber thereto by welding.

Figure 3B:
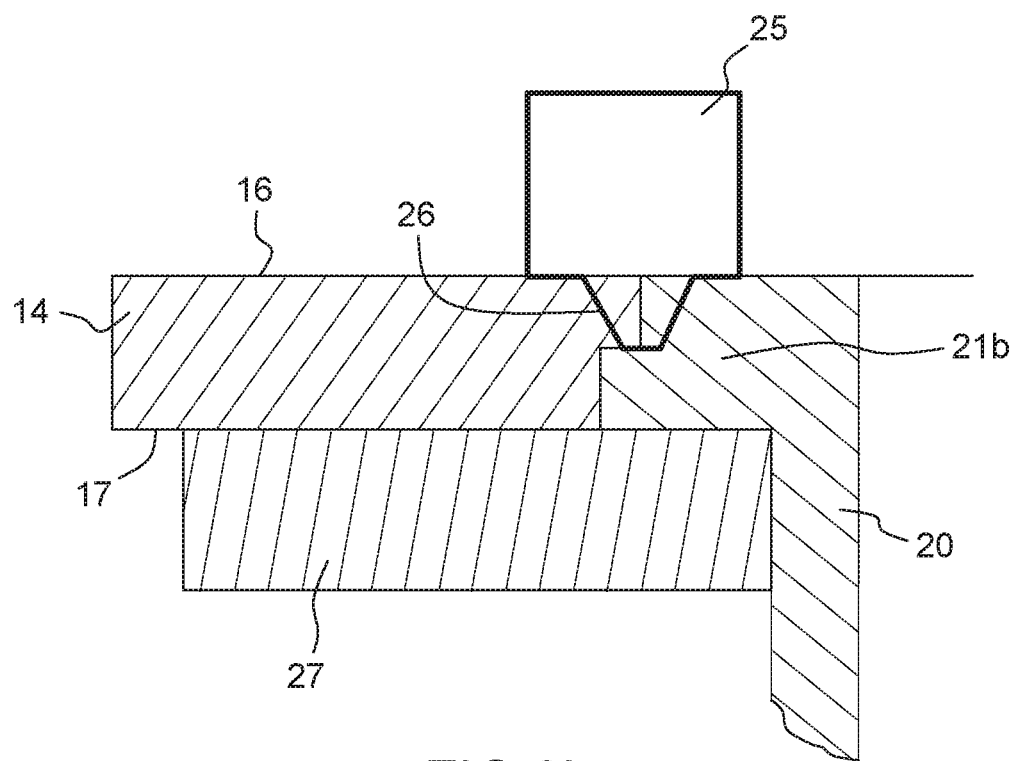

FIG. 3a shows, in perspective, the pin 25 rotating on the surface 16 at the interface between the flange 14 and the body 20. FIG. 3b shows, in cross section, the operation of friction stir welding. The pin 25 comprises a conical finger 26 intended to penetrate into the material at the interface between the two parts to be welded. At the start of operation, the finger 26 is pressed against the surface 16. During the welding operation, an anvil 27 is disposed under the flange 14, pressing against the surface 17 so as to absorb the load exerted by the pin 25. When the part 21b of the overthickness 21 is present, the anvil 27 bears both against the flange 14 and against the body 20 in its part 21b.

The rotation of the pin 25 generates heating of the surface 16, the material of which becomes pasty. The softening of the parts to be welded allows the finger 26 to penetrate into the interface between the flange 14 and the body 20. The pin 26 travels through the entire interface in order to effect complete welding. Final tests were carried out with a speed of rotation of the pin 25 of 1100 rpm, a load of 6 to 8 kN and a feed rate of 400 mm/min. Different materials were tested, for example a flange 14 and a body 20, both made of aluminum alloy of the type 6083. As a reminder, the references of the aluminum alloys originate from the European standard EN 485-2. Another final test was carried out with different alloys, for example an alloy 6083 for the body 20 and an alloy 2017 for the flange 14. The alloys of the series 6000 (aluminum alloys containing magnesium and silicon) are known for their deformability. They are well suited to the production of profiled elements such as the body 20 that forms a tube extending along its axis 12. The alloys of the series 2000 (aluminum alloys containing copper) are known for their machinability, making it easier to manufacture the flange 14. They are also known for their mechanical characteristics, notably elastic strength and breaking strength, which are greater than those of the alloys of the series 6000. Friction stir welding allows the joining of aluminum alloys of different series, even when they are not specifically designed for welding. It is thus possible to benefit from mechanical properties that are useful for the production of the body 20 by drawing and mechanical properties that are useful for the production of the flange 14 by machining. It is of course possible to choose other series of aluminum alloy depending on the need.

Figure 3C:
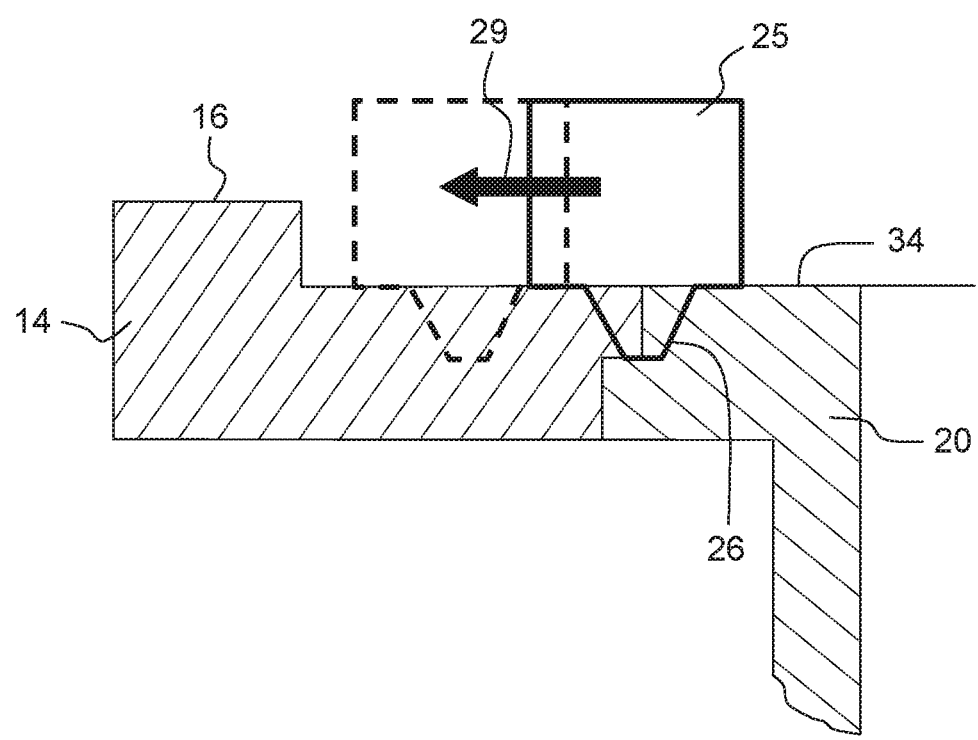
FIG. 3c illustrates a variant of the method for joining together the body and the flange.

FIG. 3c shows a variant of the flange 14 that is also welded to the body 20. In this variant, welding is carried out in a region 34 set back from the surface 16 coated with the nickel alloy deposit. The set-back region 34 is useful in particular when the body 20 and the flange 14 are welded by friction stir welding. Specifically, at the end of the welding operation, the pin 25 is withdrawn from the component 10 and can locally deform the component 10. The deformation is then situated in the set-back region 34 and does not disturb the surface 16. The set-back region 34 advantageously does not have any nickel alloy deposit in order to avoid contamination of the weld. During the production of the flange 14, the metal deposit of nickel alloy is deposited on all the surfaces of the flange 14. In order to avoid nickel appearing in the set-back region 34, it is possible to produce the set-back region by removing material, for example by machining, following the deposition of nickel.

Alternatively or in addition, it is possible to carry out the welding operation and then to re-machine the body 20 and the flange 14 at the weld bead in order to form the set-back region 34.

During friction stir welding, the pin 25 follows the interface between the body 20 and the flange 14. When the pin has traveled through the entire interface, it is possible to withdraw it by a movement in translation along the axis of rotation of the pin 25. In-house tests have shown that such withdrawal could harm the reliability of leaktightness of the weld. In order to solve this problem, before the pin 25 is withdrawn, the pin 25 is moved in translation parallel to the region 34 when the latter exists or parallel to the surface 16 in order to move the finger 26 away from the interface between the flange 14 and the body 20 before withdrawing it. This movement in translation bears the reference 29 in FIG. 3c. Before the pin is withdrawn, the latter is shown by way of dashed lines. Advantageously, the movement in translation 29 is carried out while keeping the finger 26 in the flange 14 and moving away from the body 20 in order to avoid any deformation of the body inside the vacuum chamber.

Figure 4A:
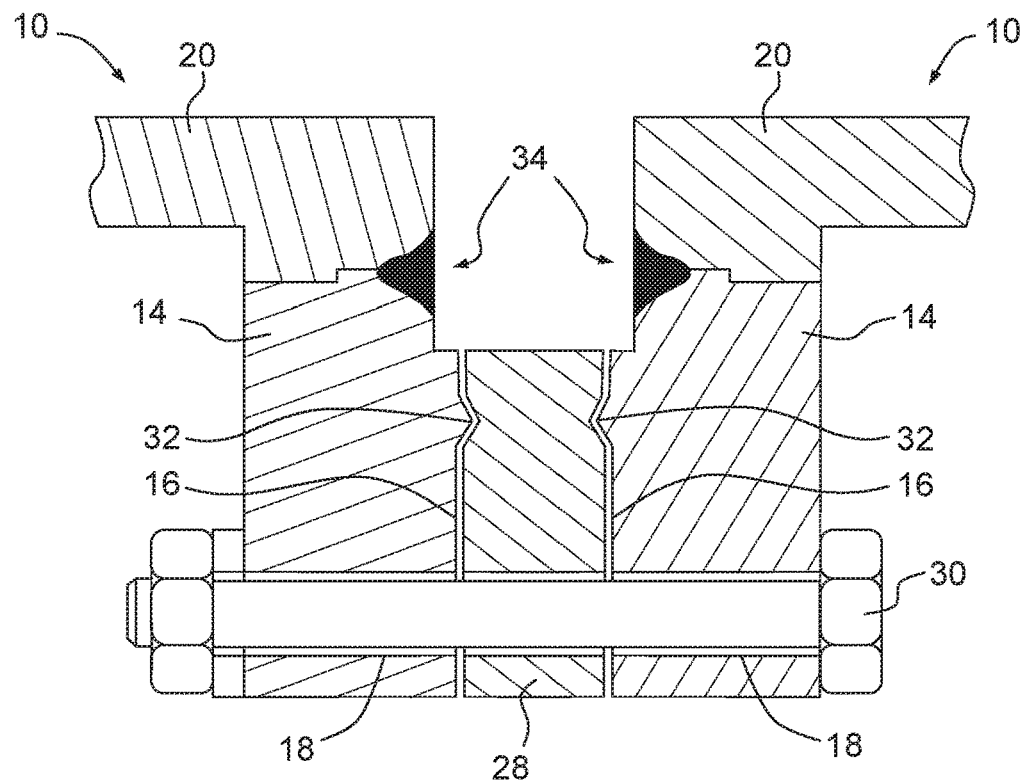
FIGS. 4a and 4b show, in partial cross section, the assembly of two components as shown in FIG. 1.
Figure 4B:
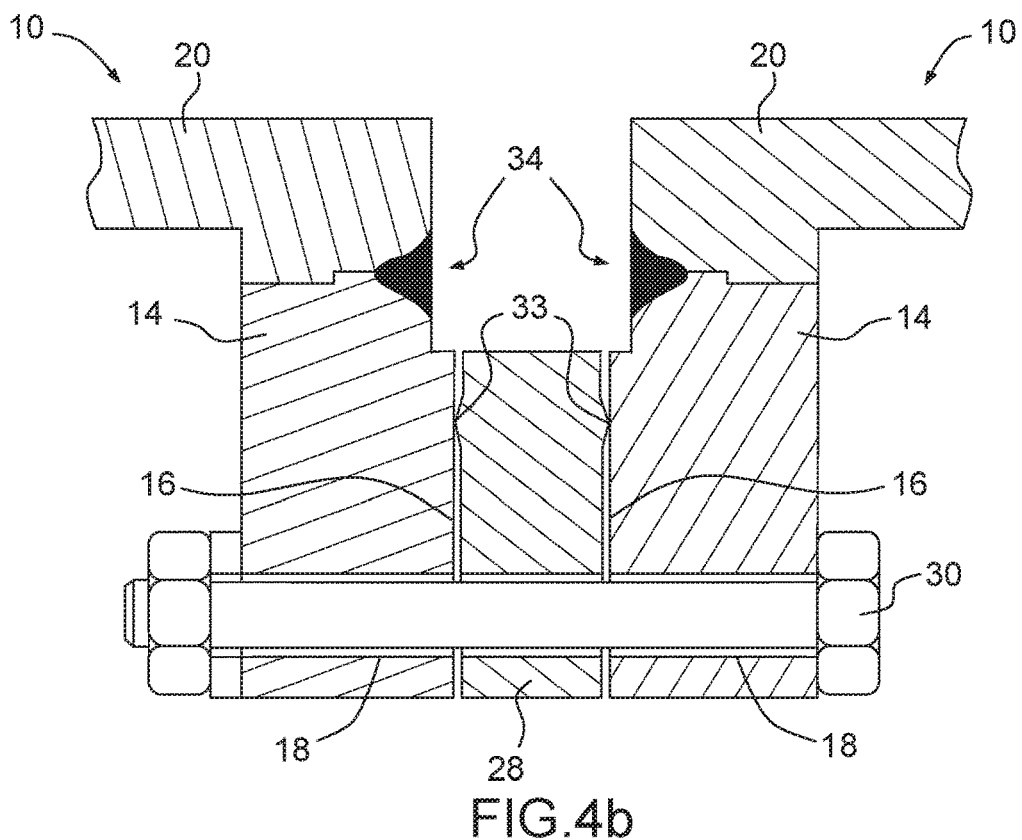

FIGS. 4a and 4b show two components 10 joined together by their flanges 14. The seal pressed between the surfaces 16 of the two flanges bears the reference 28 and an assembly bolt bears the reference 30. In FIG. 4a, blades 32, realized on each of the flanges 14, make it possible to locally deform the seal 28. Alternatively, in FIG. 4b, the surfaces 16 are flat and blades 33 are produced on the seal 28 so as to be squeezed by the surfaces 16. The blades 32 or 33 make it possible to locally increase the pressure in the assembly between two flanges 14 between which a seal 28 is interposed. This local pressure improves the leaktightness of the assembly, this being useful for producing a vacuum chamber.

Figure 5A:
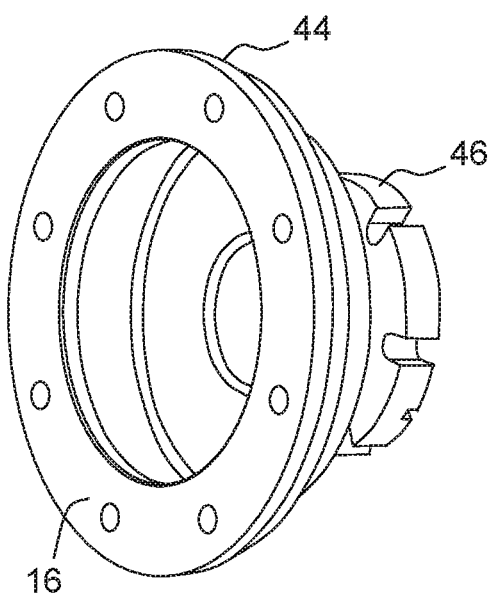
FIGS. 5a, 5b and 5c show, in perspective and in cross section, a second embodiment of a one-piece component implementing the invention.
Figure 5B:
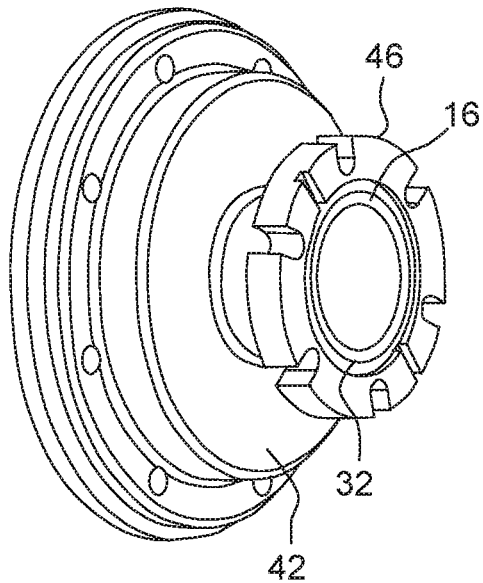
Figure 5C:
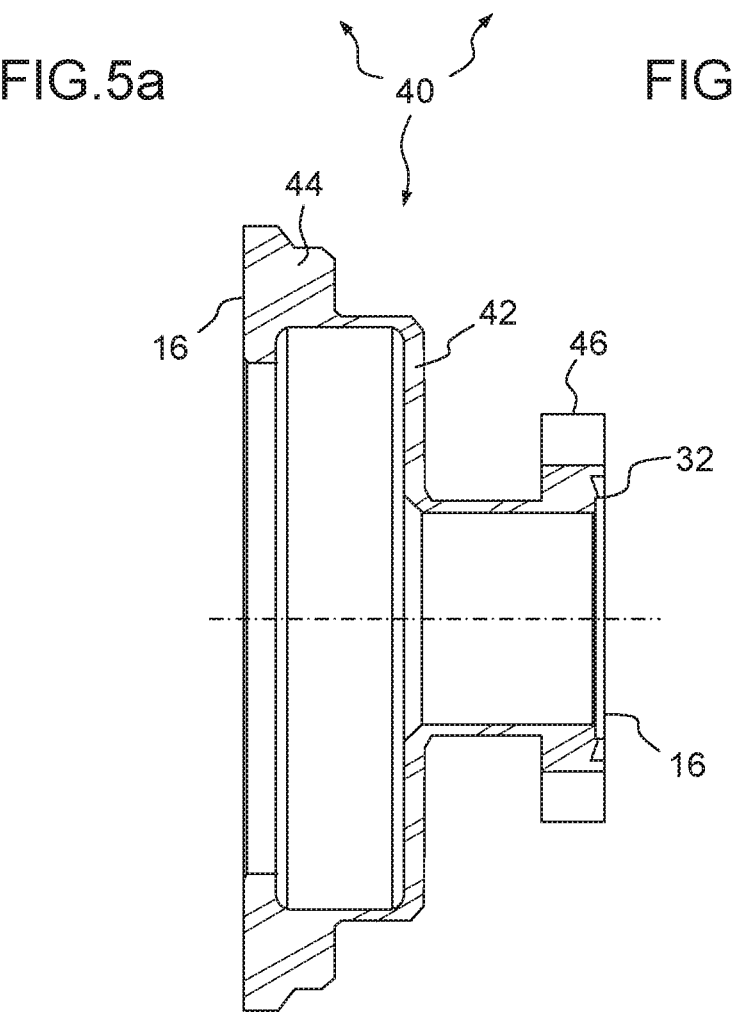

FIGS. 5a and 5b show, in perspective, a second embodiment of an assembly component 40 according to the invention. FIG. 5c shows, in cross section, the component 40. In contrast to the first embodiment, the assembly component 40 is in one piece. There is one body 42 and two flanges 44 and 46. The surface 16 of the flange 44 is flat, like the flange 14 shown in FIG. 4b. For its part, the flange 46 comprises a blade 32, like the flange 14 shown in FIG. 4a. The body 42 and the two flanges 44 and 46 are produced for example by machining from one and the same block of aluminum alloy. As in the first embodiment, the surface 16 covered with a metal deposit mostly comprising nickel is located on each of the flanges 44 and 46.

The invention claimed is:

1. An assembly component for a vacuum chamber, the component comprising:
a body and a flange, one surface of which is configured to press a seal against another mechanical part, the flange having a substantially flat washer shape extending about an axis, the body having a tubular shape about the axis, the body extending along the axis substantially from the surface beyond a thickness of the flange along the axis,
wherein the body and the flange are made of an aluminum alloy and wherein the surface is covered with a metal deposit mostly comprising nickel, and the flange and the body form two mechanical parts that are produced separately and are joined together by welding at a region not covered with the metal deposit.

2. The assembly component according to claim 1, wherein the region is set back from the surface.

3. The assembly component according to claim 2, wherein the set-back region does not have any metal deposit.

4. The assembly component according to claim 1, wherein the metal deposit comprises between 9% and 12% by weight phosphorus.

5. The assembly component according to claim 1, wherein the flange and the body are made of different aluminum alloys.

6. The assembly component according to claim 1, wherein the body is a tube of circular cross section extending along an axis, wherein the flange has a washer shape pierced substantially at the outside diameter of the tube, and wherein the surface of the flange covered with the metal deposit mostly comprising nickel extends mainly perpendicularly to the axis of the tube.

7. The assembly component according to claim 6, also comprising, close to the flange, an overthickness disposed so as to increase the exterior cross section of the body without changing the interior cross section of the body.

8. The assembly component according to claim 7, wherein the overthickness is part of the body and comprises two parts, with a first part extending in continuation of the flange and a second part extending beyond the flange along the axis.

9. A method for producing an assembly component for a vacuum chamber, the component comprising a body and a flange, the method comprising:
producing the flange and the body as two separate mechanical parts, one surface of which is configured to press a seal against another mechanical part, the flange having a substantially flat washer shape extending about an axis, the body having a tubular shape about the axis, the body extending along the axis substantially from the surface beyond a thickness of the flange along the axis, the body and the flange being made of an aluminum alloy, the surface being covered with a metal deposit mostly comprising nickel, wherein the metal deposit mostly comprising nickel is produced chemically; and
joining the flange and the body by welding at a region not covered with the metal deposit.

10. The method according to claim 9, wherein the welding of the flange to the body is carried out by friction stir welding.

11. The method according to claim 10, wherein, in order to carry out the friction stir welding, a pin passes into an interface between the flange and the body, and wherein, before the pin is withdrawn from the interface, the pin is moved in translation parallel to the surface, away from the body.

12. The method according to claim 9, for producing a component in which the welding is carried out in a region set back from the surface, wherein the set-back region is produced by removal of material following chemical deposition of the metal deposit.

13. The method according to claim 9, for producing a component in which the welding is carried out in a region set back from the surface, wherein, after welding, the surface is machined locally at the weld so as to form the set-back region.

* * * * *